US011288703B2

United States Patent
Poole et al.

(10) Patent No.: US 11,288,703 B2
(45) Date of Patent: *Mar. 29, 2022

(54) SYSTEMS AND METHODS FOR OFFERING PRODUCTS USING LINKED TRANSACTIONS

(71) Applicant: Capital One Services, LLC, McLean, VA (US)

(72) Inventors: Thomas S. Poole, McLean, VA (US); David E. Keating, McLean, VA (US); Drew Jacobs, McLean, VA (US); Janusz M. Niczyporuk, McLean, VA (US); Luke A. Hammock, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/017,820

(22) Filed: Sep. 11, 2020

(65) Prior Publication Data
US 2020/0410536 A1    Dec. 31, 2020

Related U.S. Application Data

(63) Continuation of application No. 16/384,489, filed on Apr. 15, 2019, now Pat. No. 10,825,045, which is a (Continued)

(51) Int. Cl.
*G06Q 30/02* (2012.01)
(52) U.S. Cl.
CPC ..... *G06Q 30/0255* (2013.01); *G06Q 30/0224* (2013.01)
(58) Field of Classification Search
CPC .................................................. G06Q 30/02
See application file for complete search history.

(56) References Cited

U.S. PATENT DOCUMENTS 8,321,276 B2 * 11/2012 Reichert ............ G06Q 30/0246
705/14.43
8,639,571 B1 * 1/2014 Leason ............... G06Q 30/0207
705/14.1
(Continued)

FOREIGN PATENT DOCUMENTS

IN         201741008128 A  *  9/2018  ............ G06Q 30/06
WO    WO 214/152846 A2  *  9/2014  ......... G06Q 30/0253

OTHER PUBLICATIONS

Method and System for Recommending Products based on Recent Fiancial Transaction (English (Unites States)), The IP.com Prior Art Database, Jan. 18, 2019 (Year: 2019).*

*Primary Examiner* — Marilyn G Macasiano
(74) *Attorney, Agent, or Firm* — Perkins Coie LLP

(57) ABSTRACT

The disclosed embodiments include methods, systems, and articles of manufacture for providing offers for linked transactions. Transaction data corresponding to a first product physically purchased using a financial service account and product identification data identifying the first purchased product are received. The transaction data and the product identification data are associated. A consumer that purchased the first product is determined based on at least the transaction data. Follow-on purchase to offer for sale to the consumer based on the product identification data is determined and a follow-up purchase offer to purchase the follow-on product is generated. The consumer is provided with the follow-on purchase offer to enable the consumer to purchase the follow-on product in an electronic commerce purchase transaction.

20 Claims, 8 Drawing Sheets

Related U.S. Application Data continuation of application No. 16/124,131, filed on Sep. 6, 2018, now Pat. No. 10,304,083, which is a continuation of application No. 14/288,046, filed on May 27, 2014, now Pat. No. 10,096,042.

(60) Provisional application No. 61/828,015, filed on May 28, 2013.

(56) References Cited

U.S. PATENT DOCUMENTS

| | | | |
|---|---|---|---|
| 8,744,906 B2* | 6/2014 | Fordyce, III | G06Q 30/02 705/14.1 |
| 2011/0035275 A1* | 2/2011 | Frankel | G06F 3/0481 705/14.45 |

* cited by examiner

600

Recent Transactions

| Date | Description | Amount | |
|---|---|---|---|
| 1/2/2013 | Great Groceries on Main | $250 | |
| 1/8/2013 | Clothing Express | $75 | Click Deal Available! |
| 1/10/2013 | Sushi Boat and Bar | $100 | Click Deal Available! |
| 1/13/2013 | Corner Gas | $62 | Click Deal Available! |

| Date | Description | Amount | |
|---|---|---|---|
| 1/2/2013 | Great Groceries on Main | $250 | |
| 1/6/2013 | Clothing Express | $75 | Click Deal Available! |
| 1/10/2013 | Sushi Boat and Bar | $100 | Click Deal Available! |
| 1/13/2013 | Corner Gas | $62 | Click Deal Available! |

610

710

720

You purchased:

Oxford Shirt – Blue - Size M (#10005678) $30
Causal Pants – Gray – Size 34/30 (#10004321) $45

Click the items above to automatically purchase and have the item shipped to your home address!

FIGURE 7

SYSTEMS AND METHODS FOR OFFERING PRODUCTS USING LINKED TRANSACTIONS

CROSS-REFERENCE TO RELATED APPLICATIONS

This application is a continuation of U.S. patent application Ser. No. 16/384,489, filed Apr. 15, 2019, which is a continuation of U.S. patent application Ser. No. 16/124,131, filed Sep. 6, 2018, which is a continuation of U.S. patent application Ser. No. 14/288,046, filed May 27, 2014, which claims benefit from U.S. Provisional Patent Application No. 61/828,015, filed May 28, 2013, each of which is incorporated herein by reference in its entirety.

BACKGROUND

In the current marketplace, consumers have multiple options for purchasing products (e.g., goods or services). For example, a consumer may shop for a good at a physical store of a merchant by physically examining the good, making a decision to purchase the good, and then purchasing the good at the physical store. Consumers may also purchase goods from a merchant without going to the merchant's physical store. Consumers may use paper or mail-order catalogs to purchase goods from a merchant without visiting the merchant's physical store. The ubiquity of the Internet also enables merchants to offer products for sale through the use of virtual and/or electronic catalogs. These virtual and/or electronic catalogs may be accessible through a website operated or hosted by the merchant and may be accessed by consumers using the Internet. In some cases, merchants that offer goods for sale in a physical store might offer the same or similar goods through online mechanisms, such as their website or mail-order catalog. Merchants may also sell their services through a physical store and/or using the Internet. For example, an insurance agent may offer insurance for sale through her office, or she may have a website where a consumer may purchase insurance.

When purchasing goods or services, consumers have multiple options for making the purchase. For example, consumers may use cash or a check to make purchases. Consumers may also use financial service accounts to make purchases, such as credit cards, debit cards, or other forms of electronic payments (e.g., eCheck, mobile application, electronic wallet). Consumers often receive a periodic statement describing their recent financial account purchase transactions from financial service providers, such as a bank, credit card company, and the like. Consumers may be able to access their accounts to review account information, such as statements of purchase transactions, available balance, reward points, etc., through an online profile that they have established with the financial service providers that provide their accounts. For example, a credit card company may provide a website where consumers can login, view recent transactions, and in some cases, pay their bills. Some financial services provide alerts to consumers of their account activity through the use of email, text messages, or phone calls.

SUMMARY

The disclosed embodiments may include methods, systems, and articles of manufacture configured to, for example, automatically link a physical purchase transaction to an electronic commerce purchase transaction. One disclosed embodiment may include a system for providing offers for products. The system may be configured to receive transaction data corresponding to a first product physically purchased using a financial service account and product identification data identifying the first purchased product. The system may be configured to associate the transaction data and the product identification data, and determine the consumer that purchased the first product based on at least the transaction data. The system may also be configured to determine a follow-on purchase to offer for sale to the consumer based on the product identification data and generate a follow-up purchase offer to purchase the follow-on product. The system may be configured to provide the follow-on purchase offer to enable, for example, the consumer to purchase the follow-on product in an electronic commerce purchase transaction.

Another disclosed embodiment includes a system for automatically linking one or more physical purchase transactions with one or more electronic commerce purchase transactions. In one aspect, the system may receive transaction data relating to a first physical purchase transaction associated with a user's first financial service account that is used to purchase a first product at a first merchant location. The transaction data may include product identification data that includes product attribute information describing one or more attributes about the first product. The system may be configured to link, based on the transaction data, the first physical purchase transaction with a first follow-on electronic transaction associated with a follow-on product. The linking may include generating a follow-on purchase offer for the first follow-on product at a follow-on product price, providing the follow-on purchase offer to the user, performing an electronic commerce purchase transactions for the follow-on purchase offer in response to an acceptance by the user to the follow-on purchase offer, and initiating fulfillment processes that enable the follow-on product to be shipped to the user at a specified shipping address and applies the follow-on product price to the user's financial service account.

Another disclosed embodiment includes a computer-implemented method for providing offers for products. In one aspect, the method may include receiving, by one or more processors configured to execute software instructions to perform operations to link physical purchase transactions to electronic commerce follow-on purchase transactions, transaction data corresponding to a first product physically purchased using a financial service account. The method may further include receiving product identification data identifying the first purchased product and associates the transaction data with the product identification data. The method may also include determining a consumer that purchased the first product based on at least the transaction data and a follow-on product to offer for sale to the consumer based on the product identification data of the first product is determined. The method may also include generating a follow-on purchase offer for the follow-on product and providing the follow-on purchase offer to the consumer to enable the consumer to purchase the follow-on product in an electronic commerce purchase transaction.

The disclosed embodiments may also include a mobile device configured to receive information relating to a follow-on purchase offer for a follow-on product relating to a first product previously purchased by a user using a financial service account at a merchant location associated with a merchant. The follow-on product may be identified by an offer provider system based on product identification data that was provided from a merchant system associated with the merchant. The product identification information may include product attribute data describing one or more attributes of the product purchased from the merchant. The mobile device may be configured to provide a first interface to display a user-selectable link associated with the follow-on purchase offer. The mobile device may also be configured to receive a selection of the user-selectable link, and provide a second interface displaying the follow-on purchase offer. The follow-on purchase offer may include a second user-selectable link to allow the user to electronically purchase the follow-on product. The mobile device may also be configured to receive a second selection from the user of the second user-selectable link to electronically purchase the follow-on product. The mobile device may also provide a third interface to display a confirmation message of the user's electronic purchase of the follow-on product and a message indicating that the follow-on purchase product will be shipped to a designated shipping address associated with the user.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate disclosed embodiments and, together with the description, serve to explain the disclosed embodiments.

BRIEF DESCRIPTION OF THE DRAWINGS

FIG. 6 is an exemplary user interface consistent with disclosed embodiments.

FIG. 7 is an exemplary user interface consistent with disclosed embodiments.

DETAILED DESCRIPTION

Figure 1:
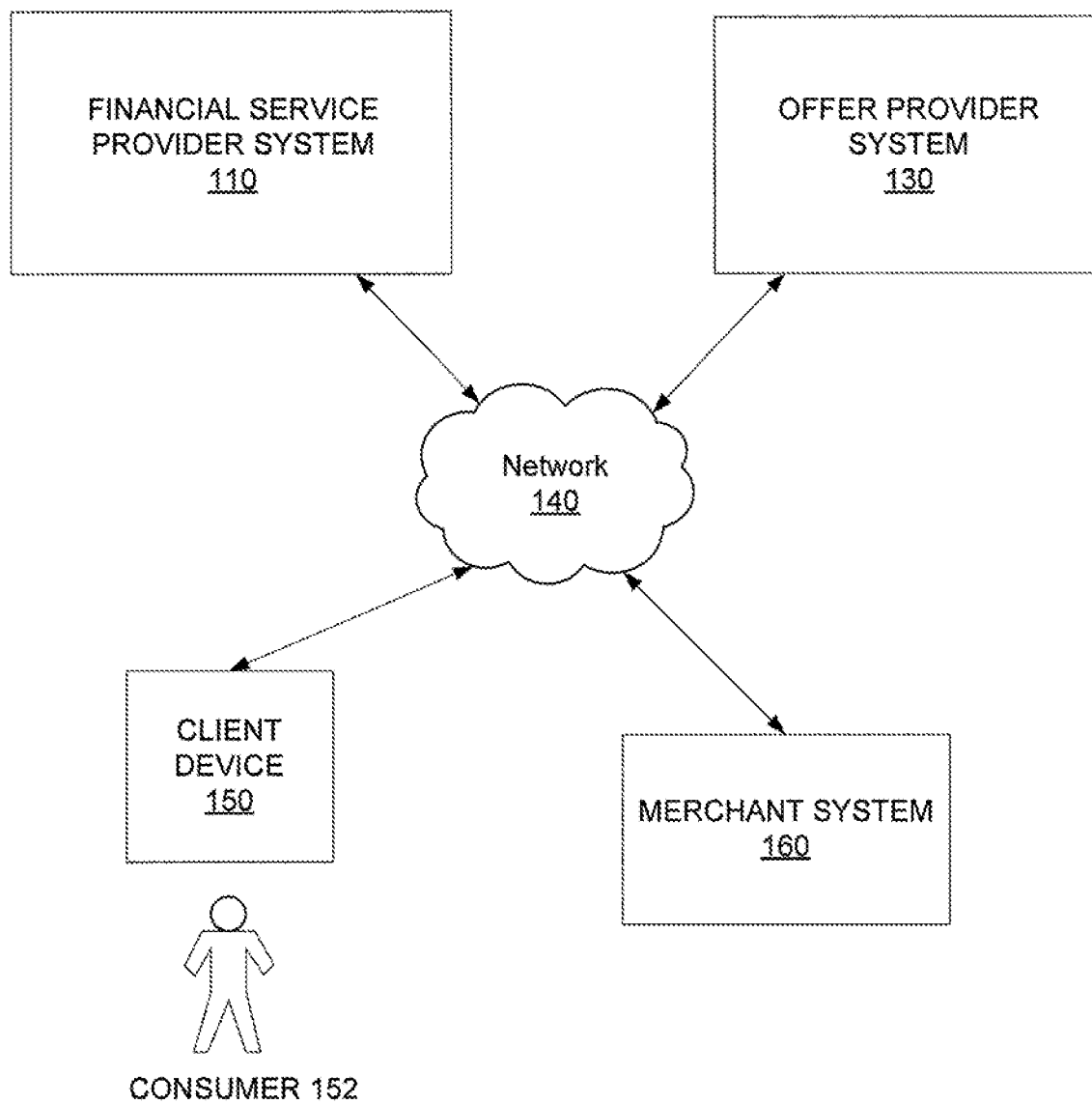
FIG. 1 is a block diagram of an exemplary system, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

After a consumer makes a purchase at a physical merchant location, the merchant may want to make an offer to the consumer to purchase a follow-on product that is related to the consumer's previous physical purchase. For example, when a consumer purchases a blue shirt, the merchant may want to offer the consumer the option to purchase another blue shirt, or a shirt of a different color in the same size. In some cases, there may be an advantage to offering the consumer the option to purchase the future product at a later point in time as opposed to at the point of sale of the original product. For example, the consumer may have more funds in the future to purchase the future product, or the consumer may decide later that she enjoys the product but may not be sure she likes the product enough to buy another at the time of purchase.

Merchants, however, face a problem in that they no longer have the attention of the consumer once the consumer has completed a purchase. While merchants may use marketing efforts such as email, direct mail, or other forms of communication to make an offer to the consumer for the future product, such marketing efforts require the consumer to take numerous actions to purchase the future product. For example, when the consumer purchases a blue shirt, the merchant may want to market a white shirt in the same size to the consumer. The merchant may send the consumer an email with a special offer to purchase the white shirt at a discounted price. After receiving the email, the consumer must either visit the merchant's website, or visit the merchant's physical store to make the purchase. In addition, the consumer may have to print a coupon or enter a coupon code to receive the discounted price. In some cases, the consumer may decide that the effort required to make the purchase is not worth the discount they may receive on the product.

The disclosed embodiments address these issues by generating and presenting a follow-on electronic commerce offer to the consumer after a physical purchase transaction. In one aspect, the disclosed embodiments may automatically link the physical transaction to the follow-on purchase transaction through the consumer's financial service transaction account, such as the consumer's credit card. The disclosed embodiments may provide mechanisms that offer the consumer the option to purchase a follow-on product using the consumer's financial service account by, for example, accepting a follow-on purchase offer electronically provided to the consumer to purchase the follow-on product using the financial service account (or another account), and have the follow-on product shipped to the consumer's address through one or a small number of actions that can be performed using a client device. For example, a consumer may physically purchase a blue shirt from a merchant location (e.g., brick and mortar location) using a financial service account (e.g., a credit card). The disclosed embodiments may include a financial service provider system that receives transaction data relating to the physical purchase (including SKU data for the purchased blue shirt). The financial service provider system may execute software instructions that automatically generates follow-on purchase offer information that is integrated with the consumer's credit card account, such that when the consumer later logs in to her credit card account, the financial service provider system may provide an interface that lists with the purchase transaction corresponding to the purchase of the blue shirt a follow-on purchase offer to purchase a follow-on product (e.g., a white shirt that is the same style and size of the blue shirt, another blue shirt, etc.). The financial service provider system may provide in the follow-on purchase offer a user-selectable option for the consumer to select (e.g., option button, hyperlink, etc.) to accept the follow-on purchase offer. In response to receiving the user's acceptance (via the selection), the financial service provider system may automatically bill the consumer's credit card account, credit the merchant for the follow-on purchase which may be for the follow-on purchase amount, or for a different amount (e.g., higher or lower than the consumer's paid price for the follow-on product), and initiate processes to have the follow-on product shipped to the consumer's shipping address (which may be predetermined by the consumer via a user profile or selected by the consumer during the follow-on purchase transaction process).

In one aspect, the disclosed embodiments may generate an offer for sale for a specific product associated with a user's previous physical purchase transaction associated with a financial service account provided by a financial service provider. In certain aspects, the disclosed embodiments may be configured to determine, generate, and provide an electronic commerce offer for sale to the user based on product information associated with transaction data associated with the physical purchase transaction, such as, for example, product identification information (e.g., SKU data), merchant identification information, and purchase amount and fee information. Aspects of the disclosed embodiments may also provide a mechanism to allow the user to perform an electronic commerce purchase transaction for the same, similar, and/or recommended other follow-on products using electronic commerce transaction mechanisms consistent with the disclosed embodiments.

For example, the disclosed embodiments may include a system for automatically linking one or more physical purchase transactions with one or more electronic purchase transactions. In one embodiment, the system may include one or more processors configured to execute software instructions stored in a memory that, when executed, perform one or more operations consistent with the disclosed embodiments. In one aspect, the processor(s) may execute the software instructions to receive transaction data relating to a physical purchase transaction associated with a user's financial service account used to purchase a product. The transaction data may include product identification information, which may identify the purchased product and one or more attributes associated with the product (e.g., identification information, size information, color information, and/or other characteristics associated with the product). The transaction data may also include financial service account information associated with the financial service account used to purchase the product.

In one embodiment, the operations may include linking, based on the transaction data, the physical purchase transaction with a follow-on electronic transaction associated with a follow-on product. In another aspect, the disclosed embodiments may link the physical purchase transaction with the follow-on electronic transaction based on a profile associated with the user (e.g., information providing profile data relating to the user, including for example, clothing sizes, preferences, brand preferences, merchant preferences, retailer preferences, etc.). In another embodiment, the linking process may include determining the follow-on product that the user may purchase in the follow-on electronic commerce purchase transaction based on the transaction data. The follow-on product may include, for example, a second product that is identical to the product previously purchased in the physical purchase transaction. For example, if the first physical purchase transaction involved the purchase of a medium size blue shirt from a specific first retailer, the follow-on product may include another medium size blue shirt from the specific first retailer. In other embodiments, the follow-on product may be a second product similar to the product previously purchased in the physical purchase transaction (e.g., the same type of shirt of a different color, different size, etc.). In another embodiment, the follow-on product may be a different type of product than the product previously purchased in the physical purchase transaction (e.g., pants, accessory item [e.g., belt, tie, etc.], and the like).

In certain aspects, the operations may also include generating a follow-on purchase offer for the follow-on product and provide the follow-on purchase offer to the user. In some embodiments, the disclosed embodiments may generate the follow-on purchase offer in an electronic format (e.g., website, text message, email, etc.) that is provided to the user via a client device, such as a smart phone, PDA, laptop computer, desktop computer, tablet, etc. In one example, the operations may include providing the follow-on purchase offer in a selectable message included in an electronic transaction summary document that may be accessible to the user via the client device (e.g., financial account transaction summary statement, listing, or the like). In response to receiving a selection by the user of the follow-on purchase offer message, the disclosed embodiments may generate and provide a follow-on purchase offer message providing purchase information that the user can consider to purchase the follow-on product via electronic commerce mechanisms. For instance, the operations may include providing, in response to the user's selection, a follow-on purchase message that allows the user to purchase the follow-on product for a specified price over the Internet. If the user agrees (via, for example, selecting an option to accept the purchase), the disclosed embodiments may automatically complete the purchase transaction using the same financial service account used to purchase the product during the physical purchase transaction (or alternatively a predefined or user selectable other account). In certain aspects, the disclosed embodiments may automatically generate and send a purchase order request to a merchant system associated with the merchant that sold the first product to the user, which is used to fulfill the request. In certain aspects, the disclosed embodiments may provide the shipping address for the user to the merchant system, which may be stored with the user's profile. In other aspects, the disclosed embodiments may allow the user to purchase the follow-on product without having to pay shipping fees. In other aspects, the disclosed embodiments may provide incentives in the follow-on purchase offer for the user to purchase the follow-on product (e.g., discounted price, free shipping, reward points, no or lower interest rate applied to the purchase transaction, etc.) In another aspect, the disclosed embodiments may provide other forms of follow-on purchase offers, such as store credit, vouchers, etc. for purchasing the follow-on product. In another embodiment, the operations may include automatically processing the follow-on purchase transaction by billing the user's financial service account the amount for the follow-on electronic commerce purchase transaction.

The disclosed embodiments may also include a computer-implemented method for automatically linking one or more physical purchase transactions with one or more electronic purchase transactions. In one embodiment, the method may include one or more processes that, when executed by one or more processors particularly configured to execute software instructions, perform one or more operations consistent with the disclosed embodiments, such as those operations disclosed above and herein.

The disclosed embodiments may, in one embodiment, provide the linking of physical purchase transactions with follow-on electronic commerce purchase transactions based on product specific transaction data that is provided by the selling merchant to the financial service provider system. For example, conventional purchase transactions typically do not involve the sharing of product information (e.g., SKU level data, and the like) from the merchant to financial service providers. For example, while a financial service provider may receive transaction data relating to a purchase transaction, conventional processes typically only involve transaction data including the merchant location and purchase amount information. Aspects of the disclosed embodiments may use additional data concerning the individual products that make up a purchase transaction to identify one or more follow-on products, generate and provide one or more follow-on purchase offers, and fulfill follow-on purchase transactions.

Certain disclosed embodiments may also provide an interface (e.g., a follow-on purchase application programming interface (API)) that may allow a merchant to provide transaction data associated with a physical purchase transaction that includes product identification information (e.g., brand, color, size, type of product, and/or other product attributes) to a follow-on product offer system, which may include a financial service provider system. The transaction data may also include other information, such as financial service account information (e.g., the account used to purchase a product in the physical purchase transaction), merchant information (e.g., merchant identification information). In certain aspects, the follow-on offer provider system may provide the follow-on purchase API to the merchant (e.g., downloadable by the merchant over the Internet or other electronic communication mechanisms). In other aspects, the merchant may provide the transaction data to the follow-on product offer system using other electronic communication mechanisms, such as Electronic Data Interchange (EDI), portal communications, electronic mail, FTP site, or other types of data communications. In certain embodiments, merchant systems may also, through the follow-on purchase API (or other communication mechanism), provide the follow-on offer provider system with product identification data of available other products, or of products that the merchant may offer special deals or incentives (e.g., discounts, sales, etc.). The follow-on offer provider system may execute software instructions that automatically determine one or more of follow-on products that may be related to the product purchased during the physical purchase transaction. The follow-on offer provider system may also be configured to automatically generate a follow-on offer that is provided to the consumer via a client device.

FIG. 1 is a block diagram of an exemplary system 100 for performing one or more operations consistent with the disclosed embodiments. In one embodiment, system 100 may include one or more financial service provider system 110, one or more offer provider systems 130, one or more clients devices 150, one or more merchant systems 160, and a network 140. The components and arrangement of the components included in system 100 may vary. Thus, system 100 may include fewer or additional components that perform or assist in the performance of one or more processes consistent with the disclosed embodiments.

One or more components of system 100 may be computing systems configured to provide follow-on electronic commerce purchase offers for products (e.g., goods or services) consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices are configured to execute software instructions stored on one or more memory devices to perform one or more operations consistent with the disclosed embodiments. Components of system 100 may be configured to communicate with one or more other components of system 100, including financial service provider system 110, offer provider system 130, client devices 150, and/or merchant system 160. In certain aspects, users may operate one or more components of system 100 to initiate one or more operations consistent with the disclosed embodiments. In some aspects, the one or more users may be employees of, or associated with, the entity corresponding to the respective component(s) (e.g., someone authorized to use the underlying computing systems or otherwise act on behalf of the entity). In other aspects, the consumer may not be an employee or otherwise associated with underlying entity. In still other aspects, the user may itself be the entity associated with the respective component (e.g., consumer 152 operating client device 150).

Financial service provider system 110 may be a system associated with a financial service provider, such as a bank, credit card issuer, credit bureau, credit agency, or other entity that generates, provides, manages, and/or maintains financial service accounts for one or more users. Financial service provider system 110 may generate, maintain, store, provide, and/or process financial data associated with one or more financial service accounts. Financial data may include, for example, financial service account data (e.g., financial service account identification data, financial service account attribute data (e.g., account balance, available credit, existing fees, reward points, and user profile information), financial service account transaction data (e.g., transaction dates, transaction amounts, transaction types, location of transaction, etc.). Financial service provider system 110 may include infrastructure and components that are configured to generate and/or provide financial service accounts such as credit card accounts, checking accounts, savings account, debit card accounts, loyalty or reward programs, lines of credit, and the like.

Offer provider system 130 may be a computing system configured to provide follow-on offers for products (e.g., goods and/or services) consistent with disclosed embodiments. For example, offer provider system 130 may be a computer system configured to execute software instructions that automatically determine, generate, and provide follow-on purchase offers for a follow-on product. In certain non-limiting aspects, a follow-on product may be a product that is offered for purchase to a consumer following a physical purchase transaction for one or more other products. In certain embodiments, offer provider system 130 may be configured to identify one or more follow-on products and/or provide one or more follow-on purchase offers, based on transaction data including product information associated with a product purchased during a previously performed physical purchase transaction involving a merchant (relating to, for example, merchant system 160), consumer 152, and a financial service account for the consumer provided by financial service provider (associated with, for example, financial service provider system 110). Offer provider system 130 may also provide offers or invitations to apply for financial service accounts.

According to some embodiments, offer provider system 130 may include a computing system that is affiliated with, or is part of, financial service provider system 110. Offer provider system 130 may include one or more computing devices (e.g., server(s)), memory storing data and/or software instructions (e.g., database(s), memory devices, etc.) and other known computing components. Offer provider system 130 may be configured to communicate with one or more components of system 100, such as financial service provider system 110, merchant systems 160, and/or client devices 150. Offer provider system 130 may be configured to provide offers for products or services via an interface(s) accessible by users over a network (e.g., the Internet). For example, offer provider system 130 may include a web server that hosts a web page accessible through network 140 by client device(s) 150.

Client device(s) 150 may be one or more computing devices configured to perform one or more operations consistent with disclosed embodiments. Client device 150 may be a desktop computer, a laptop, a server, a mobile device (e.g., tablet, smart phone, etc.), or any other type of computing device. Client device 150 may also include a television, e-reader, or any other type of device capable of communicating with other components of system 100. According to some embodiments, client device 150 may comprise a network-enabled computing device operably connected to one or more other presentation devices, which may themselves constitute client devices 150.

Client device(s) 150 may include one or more processors configured to execute software instructions stored in memory, such as memory included in client device 150. Client device 150 may include software that when executed by a processor performs known Internet-related communication and content presentation processes. For instance, client device 150 may execute software that generates and displays interfaces and/or content on a presentation device included in, or connected to, client device 150. Client device 150 may be a mobile device that executes mobile device applications and/or mobile device communication software that allows client device 150 to communicate with components of system 100 over network 140. The disclosed embodiments are not limited to any particular configuration of client device 150.

Merchant system 160 may be one or more computing systems associated with a merchant that provides products (e.g., goods and/or services), such as a restaurant (e.g., Outback Steakhouse®, Burger King®, etc.), retailer (e.g., Amazon.com®, Target®, etc.), grocery store, service provider (e.g., utility company, insurance company, financial service provider, automobile repair services, etc.), non-profit organization (ACLU™, AARP®, etc.) or any other type of entity that provides goods, services, and/or information that consumers (i.e., end-users or other business entities) may purchase, consume, use, etc. For ease of discussion, the present disclosure may describe exemplary embodiments in the context of purchase transactions involving goods from retail merchant systems. However, merchant system 160 is not limited to systems associated with retail merchants that conduct business in any particular industry or field.

Merchant system 160 may be associated with a merchant brick and mortar location(s) that a consumer (e.g., consumer 152) may physically visit and purchase goods and services. Such physical locations may include merchant system 160, which may include computing devices that perform financial service transactions with consumers (e.g., Point of Sale (POS) terminal(s), kiosks, etc.). Merchant system 160 may also include back- and/or front-end computing components that store data and execute software instructions to perform operations consistent with disclosed embodiments, such as computers that are operated by employees of the merchant (e.g., back office systems, etc.). Merchant system 160 may also be associated with a merchant that provides goods and/or service via known online ore-commerce type of solutions. For example, such a merchant may sell products via a website using known online or e-commerce systems and solutions to market, sell, and process online transactions. Merchant system 160 may include server(s) that are configured to execute stored software instructions to perform operations associated with a merchant, including one or more processes associated with processing purchase transactions, generating transaction data, generating product data (e.g., SKU data) relating to purchase transactions, etc.

Network 140 may be any type of network configured to provide communications between components of system 100. For example, network 140 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s), such as links between financial service provider system 110, offer provider system 130, client device 150, and merchant system 160.

Figure 2:
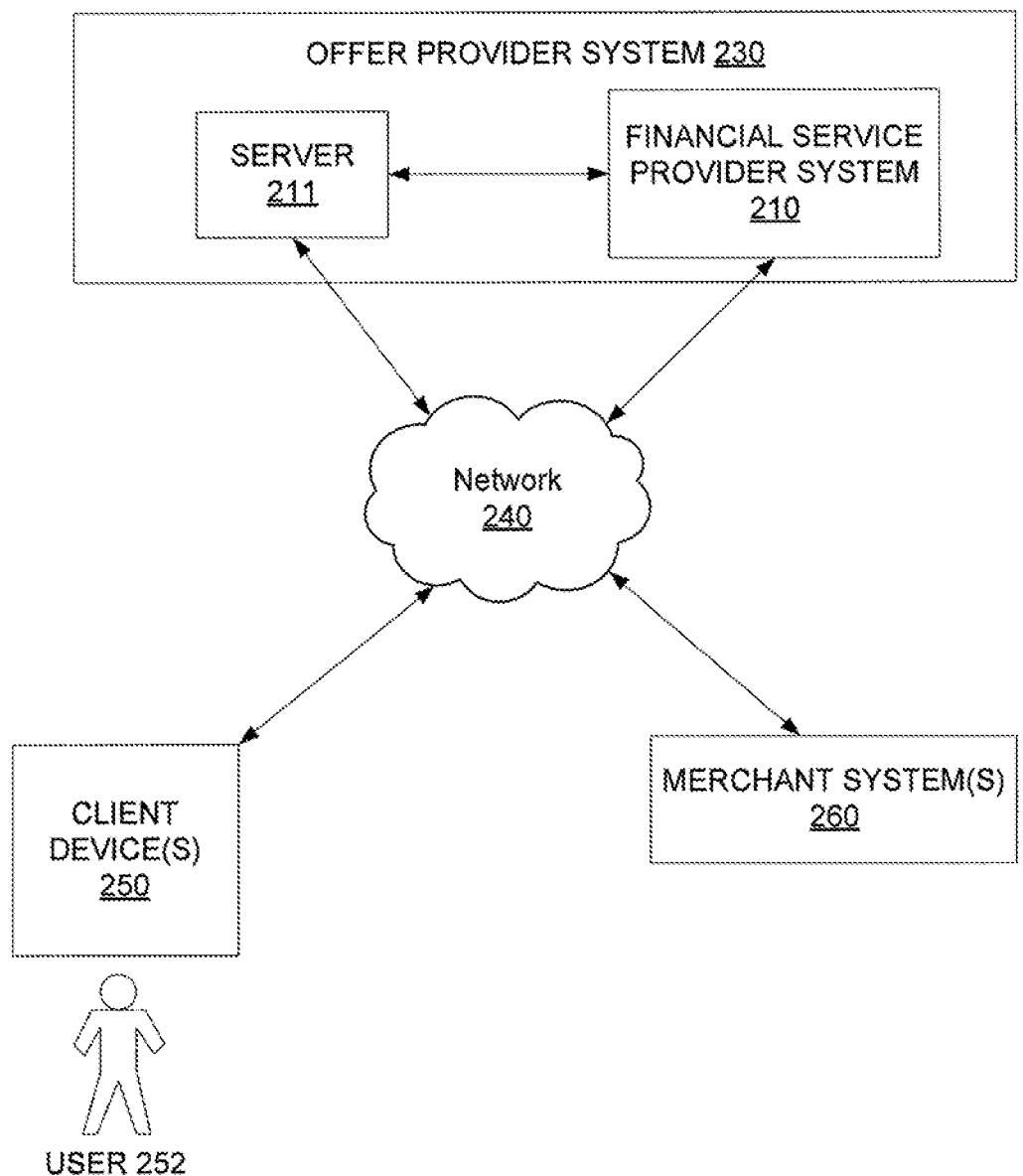
FIG. 2 is a block diagram of another exemplary system, consistent with disclosed embodiments.

FIG. 2 is a block diagram of an exemplary system 200 that may perform one or more operations consistent with the disclosed embodiments. In certain embodiments, offer provider system 230 may be configured to include financial service provider system 210 consistent with disclosed embodiments, or the financial data system may be configured to include the offer provider system (not shown). For example, offer provider system 230 may include a financial service provider system 210 that is configured to provide financial data in a manner consistent with that disclosed above in connection with financial service provider system 110 as shown in FIG. 1. Consistent with disclosed embodiments, financial service provider system 210 may use or otherwise directly communicate with computing devices of offer provider system 230 (e.g., server 211). Furthermore, offer provider system 230 may directly access memory devices of financial service provider system 210 (not shown) to retrieve, for example, financial transaction data associated with consumers or merchants. Offer provider system 230 may otherwise be configured and operate similar to offer provider system 130 disclosed above in connection with FIG. 1. Similarly, financial service provider system 210, client devices 250, and merchant systems 260 may be configured and operate similar to similarly labeled components disclosed above in connection with FIG. 1.

Alternatively, the disclosed embodiments may include a financial service provider system 110 that includes an offer provider system 130. As another example, financial service provider 110 may be configured to execute software instructions that performs the same operations and functions as those disclosed herein in connection with offer provider system 130 or 230.

It is to be understood that the configuration and boundaries of the functional building blocks of systems 100 and 200 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, offer provider systems 130, 230 may constitute a part of components of systems 100, 200 other than those specifically described (e.g., merchant system 160, 260 and/or client devices 150, 250) or may constitute a part of multiple components of system 100 (i.e., a distributed system). Such alternatives fall within the scope and spirit of the disclosed embodiments.

Figure 3:
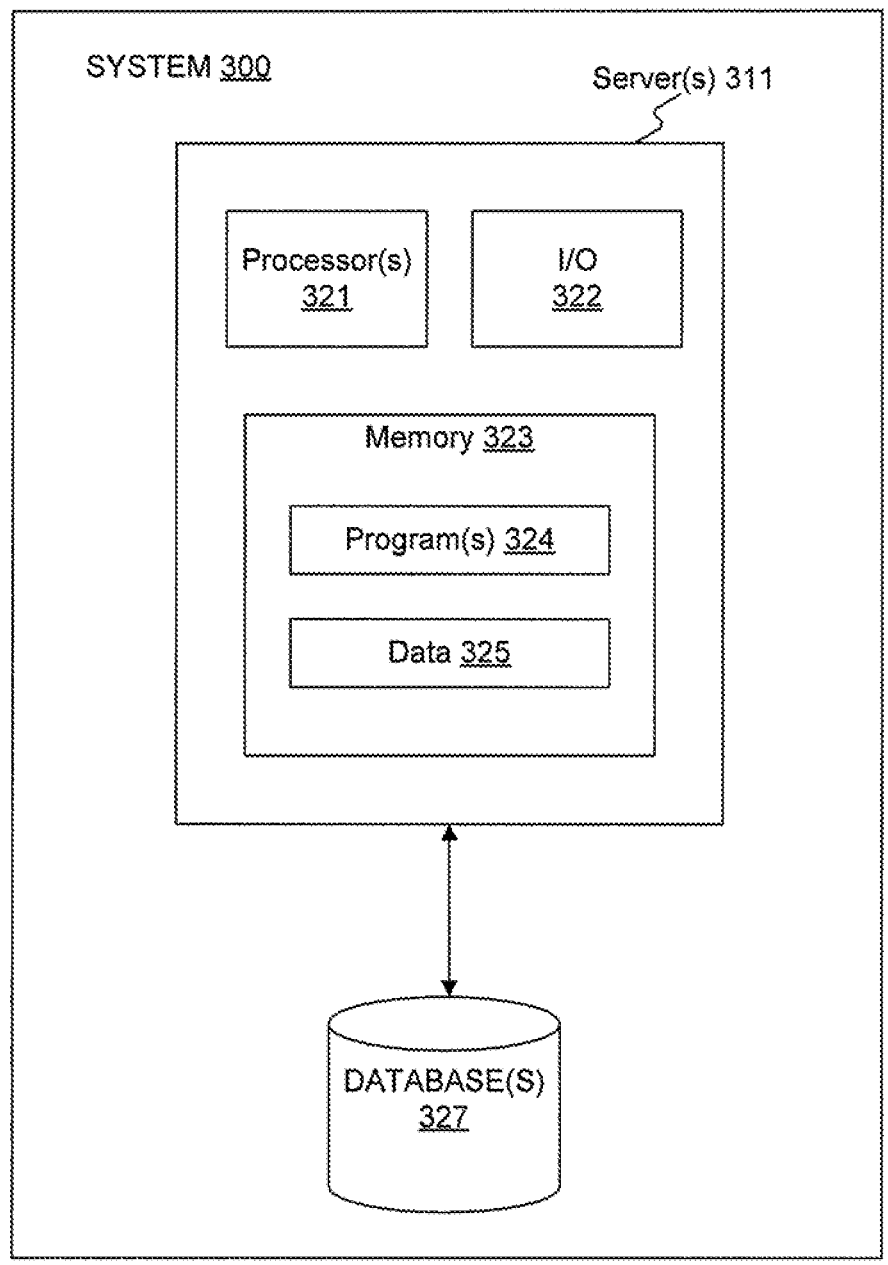
FIG. 3 is a block diagram of another exemplary system, consistent with disclosed embodiments.

FIG. 3 shows an exemplary system 300 for implementing certain embodiments consistent with the present disclosure. For example, system 300 may represent components included with financial service provider system 110, offer provider system 130, client devices 150, and/or merchant systems 160. For instance, financial service provider system 110 may be configured with a computer system similar to system 300. Also, for example, merchant system 160 may be configured with a computer system similar to system 300.

In one embodiment, system 300 may include a computing device (shown as an example server 311) having one or more processors 321, one or more memories 323, and one or more input/output (I/O) devices 322. In some embodiments, server 311 may take the form of a mobile computing device, general purpose computer, a mainframe computer, or any combination of these components. Alternatively, server 311 (or a system including server 311) may be configured as a particular apparatus, embedded system, dedicated circuit, and the like based on the storage, execution, and/or implementation of the software instructions that perform one or more operations consistent with the disclosed embodiments. According to some embodiments, server 311 may comprise web server(s) or similar computing devices that generate, maintain, and provide web site(s) consistent with disclosed embodiments. Server 311 may be standalone, or it may be part of a subsystem, which may be part of a larger system. For example, server 311 may represent distributed servers that are remotely located and communicate over a network (e.g., network 140) or a dedicated network, such as a LAN. Server 311 may correspond to server 211, or separately to any server or computing device included in financial service provider system 110, offer provider system 130, client devices 150, and/or merchant systems 160.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 311.

Memory 323 may include one or more storage devices configured to store instructions used by processor 321 to perform one or more operations consistent with the disclosed embodiments. For example, memory 323 may be configured with one or more software instructions, such as program(s) 324 that may perform one or more operations when executed by processor 321. The disclosed embodiments are not limited to separate programs or computers configured to perform dedicated tasks. For example, memory 323 may include a single program 324 that performs the functions of the server 311, or program 324 could comprise multiple programs. Additionally, processor 321 may execute one or more programs located remotely from server 311. For example, financial service provider system 110, offer provider system 130, client devices 150, and/or merchant systems 160, may, via server 311, access one or more remote programs that, when executed, perform functions related to certain disclosed embodiments. Memory 323 may also store data 325 that may reflect any type of information in any format that the system may use to perform operations consistent with the disclosed embodiments.

I/O devices 322 may be one or more devices configured to allow data to be received and/or transmitted by server 311. I/O devices 322 may include one or more digital and/or analog communication devices that allow server 311 to communicate with other machines and devices, such as other components of systems 100 and 200.

Server 311 may also be communicatively connected to one or more database(s) 327. Server 311 may be communicatively connected to database(s) 327 through network 140. Database 327 may include one or more memory devices that store information and are accessed and/or managed through server 311. By way of example, database (s) 327 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 300 may include database 327. Alternatively, database 327 may be located remotely from the system 300. Database 327 may include computing components (e.g., database management system, database server, etc.) configured to receive and process requests for data stored in memory devices of database(s) 327 and to provide data from database 327.

Figure 4A:
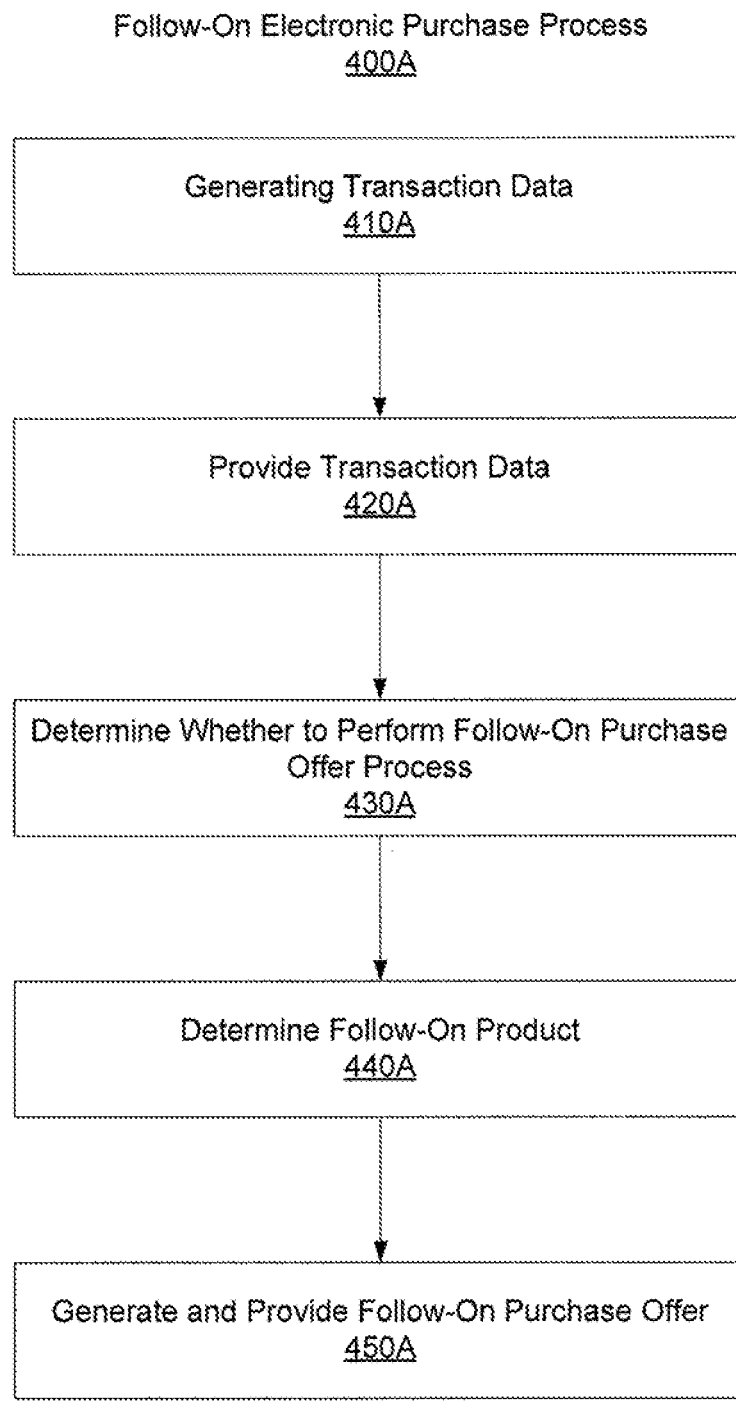
FIG. 4A is a flowchart of an exemplary follow-on electronic purchase offer process consistent with disclosed embodiments.

FIG. 4A shows a flowchart of an exemplary follow-on electronic purchase offer process 400A consistent with certain disclosed embodiments. In one aspect, the process may include merchant system 160 generating first transaction data associated with a first physical purchase transaction involving consumer 152 using a financial service account provided by financial service provider 110 to purchase a product from a merchant associated with merchant system 160 (step 410A). In one embodiment, merchant system 160 may be configured to execute software processes that automatically generate the first transaction data for the physical purchase transaction to include one or more of product specific information (e.g., product description, product price, product attributes (e.g., color, size, type, model number, serial number, or other SKU-level data), merchant information (e.g., merchant identification, merchant location), timestamp information (e.g., time and date when transaction occurred), and other transaction data known to be collected during purchase transactions as known to one of ordinary skill in the art. In other aspects, the transaction data may include, among other things, the date and time for the transaction, the purchase amount for the transaction, a unique consumer identifier associated with the transaction, a description of the merchant for the transaction, a category code associated with the merchant (e.g., retail goods, medical services, dining), and geographic indicator (e.g., postal code, street address, GPS coordinates, etc.).

In step 420A, merchant system 160 may provide the first transaction data to financial service provider system 110 and/or offer provider system 130. In one embodiment, merchant system 160 may send the first transaction data at the time (or soon thereafter) of generating the transaction data. In other embodiments, merchant system 160 may send the transaction data at a later time (e.g., at the end of the day, or at a specified time interval (hourly), etc.). In another embodiment, merchant system 160 may send the first transaction data in a batch with other transaction data associated with other purchase transactions that occurred with the merchant associated with merchant system 160. In certain aspects, merchant system 160 may use the follow-on API described above to provide the first transaction data to financial service provider system 110 and/or offer provider system 130.

Financial service provider system 110 and/or offer provider system 130 may receive the first transaction data and determine whether to perform a follow-on purchase offer process (step 430A). In one aspect, financial service provider system 110 and/or offer provider system 130 may determine to perform the follow-on purchase offer process based on whether consumer 152 has previously registered to take part in follow-on purchases with financial service provider 110 and/or offer provider system 130. Alternatively, financial service provider system 110 and/or offer provider system 130 may determine to perform the follow-on purchase offer process based on one or more rules or conditions, such as whether profile information associated with consumer 152 meets certain criteria to be targeted for follow-on purchase offers.

If financial service provider system 110 and/or offer provider system 130 determines that the follow-on purchase offer process is to be performed, financial service provider system 110 and/or offer provider system 130 identify a follow-on product to offer for potential purchase to consumer 152 (step 440A). In certain aspects, financial service provider system 110 and/or offer provider system 130 may determine the follow-on product based on the first transaction data provided by merchant system 160. For example, financial service provider system 110 and/or offer provider system 130 may analyze the product specific data included in the first transaction data to identify the specific product physically purchased by consumer 152 during the physical purchase transaction. In another embodiment, financial service provider system 110 and/or offer provider system 130 may access and consider user profile data associated with consumer 152 to determine a follow-on product. For instance, financial service provider system 110 and/or offer provider system 130 may provide online mechanisms that enable consumer 152 to provide profile information that is stored in a database for subsequent use by the disclosed embodiments. The profile data may include, for example, the consumer's preferred brands, clothing sizes, shipping address, text message contact number, email address, preferred merchants, threshold prices for certain products (e.g., $100 for a shirt, $150 for pants, etc.).

Financial service provider system 110 and/or offer provider system 130 may determine whether the merchant associated with merchant system 160 has additional inventory of the same product previously purchased by consumer 152 and identified in the first transaction data. In certain aspects, financial service provider system 110 and/or offer provider system 130 may also determine whether the merchant has other similar products that share one or more attributes with the product identified in the first transaction data (e.g., the same size shirt of different color, etc.) In other aspects, financial service provider system 110 and/or offer provider system 130 may determine whether the merchant has other products that are different but have an assigned common characteristic with the purchased product (e.g., pants, belts, jewelry, etc.). For example, merchant 160 may be configured to assign characteristic labels to the product information for the products it sells to provide links between certain products that may be used by financial service provider system 110 and/or offer provider system 130 to determine related different follow-on products.

Financial service provider system 110 and/or offer provider system 130 may generate a follow-on purchase offer for the determined follow-on product and provide the offer to consumer 152 (step 450A). In one aspect, financial service provider system 110 and/or offer provider system 130 may generate an electronic message (e.g., email, text message, etc.) that is sent to consumer 152 via client device 150. The message may identify the follow-on product and includes an offer that consumer 152 if selected (e.g., via clicking a hyperlink etc.), automatically initiates an electronic commerce purchase transaction of the follow-on product for the price identified in the message. In other embodiments, financial service provider system 110 and/or offer provider system 130 may provide the follow-on purchase offer message via a link in a financial account transaction record that is provided to consumer 152 via client device 150. Consumer 152 may select the link in the transaction statement to view and accept the offer. Thus, as an example, the disclosed embodiments may enable consumer 152 to receive an alert on their mobile device regarding a follow-on purchase offer after the consumer has completed a physical purchase transaction at a merchant (e.g., when the consumer is in the parking lot of the merchant's location, when the consumer is later at home, etc.).

Figure 4B:
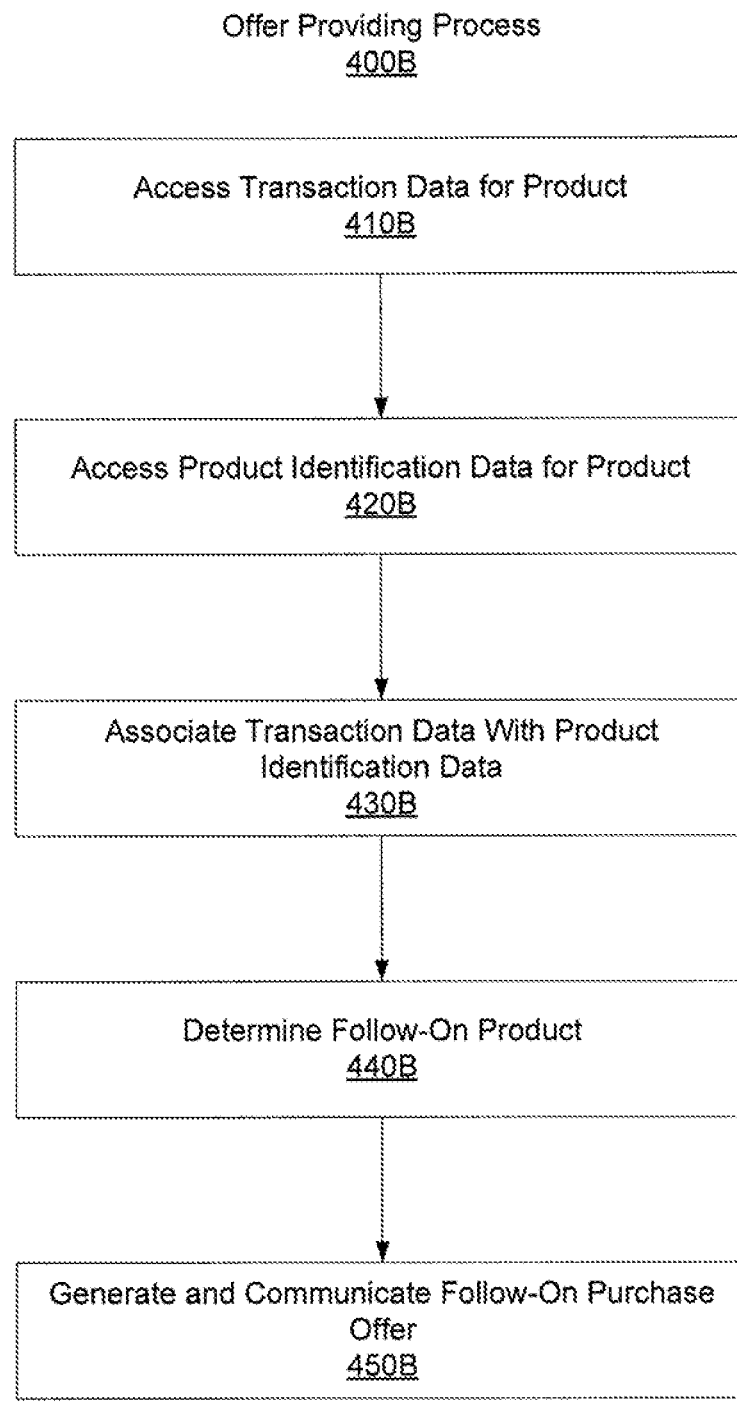
FIG. 4B is a flowchart for an exemplary offer providing process consistent with disclosed embodiments.

FIG. 4B shows a flowchart of an exemplary offer providing process 400B consistent with certain disclosed embodiments. Offer providing process 400B may be performed, for example, by offer provider system 130, financial service provider system 110, or a combination of both. For exemplary purposes only, offer providing process 400B is described in connection with operations performed by offer provider system 130. In certain embodiments, offer provider system 130 may perform one or more of the processes included in offer providing process 400B periodically (e.g., hourly, daily, weekly, etc., or dynamically, such as on an as-needed basis (e.g., in response to a request, etc.). For example, offer provider system 130 may perform one or more processes included in offer providing process 400B in response to a request or command from financial service provider system 110, merchant system 160, or client device 150. For instance, financial service provider system 150 may be configured to send a request to perform offer providing process 400B in response to receiving transaction data (including product transaction data (e.g., SKU data, etc.) from merchant 160 relating to a selection from consumer 152 in a follow-on offer provided in an electronic document, such as an electronic transaction document that consumer 152 may receive when accessing their financial service account via financial service account system 110 and client device 150.

According to some embodiments, offer providing process 400B may begin when offer provider system 130 accesses transaction data (step 410B). The transaction data may reflect, for example, one or more physical purchase transactions at one or more merchants offering good and/or services. In some embodiments, offer provider system 130 may access or receive the transaction data from financial service provider system 110. The offer provider system 130 may receive the data on a transaction by transaction basis. For example, offer provider system 130 may receive transaction data for a single transaction, as the transaction is processed by financial service provider system 110. In some embodiments, offer provider system 130 may receive the transaction data in a batch message with other transactions, and on a periodic basis. For example, offer provider system 130 may access daily transaction data corresponding to all transactions that occurred with the last 24 hours.

Offer provider system 130 may access transaction data by requesting it from financial service provider system 110, or financial service provider system 110 may transmit the spending transaction data to offer provider system 130 without prompting from offer provider system 130. The transaction data may be sent as a data stream, text file, serialized object, or any other method known in the art for transmitting data between computing systems. In some embodiments, financial service provider system 110 exposes an application programming interface (API) that makes the data available to offer provider system 130. To access spending transaction data, offer provider system 130 may make a function call to the API to receive spending transaction data. Those of ordinary skill in the art may contemplate additional methods and mechanisms for transferring transaction data between offer provider system 130 and financial service provider system 110 without changing the scope and sprit of the disclosed embodiments.

In some embodiments, the transaction data may include information regarding one or more consumer transactions. The transaction data for a consumer transaction may include, among other things, the date and time for the transaction, the purchase amount for the transaction, a unique consumer identifier associated with the transaction, a description of the merchant for the transaction, a category code associated with the merchant (e.g., retail goods, medical services, dining), and geographic indicator (e.g., postal code, street address, GPS coordinates, etc.).

In certain embodiments, the transaction data may originate from several financial service provider systems 110, each providing different types of transaction data for each consumer transaction. In such scenarios, the information contained in the spending transaction data originating from a first financial data system may be different from the information contained in spending transaction data originating from a second financial data system. Accordingly, in some embodiments, the offer provider system 130 may translate the data received from financial service provider system 110 before continuing with offer providing process.

Consumer transactions reflected in the accessed transaction data may include several types of consumer transactions. For example, the consumer transactions may correspond to credit card purchases or refunds, debit card purchases or refunds, eChecks, electronic wallet transactions, wire transfers, etc. The consumer transactions may also include transactions associated with reward or loyalty programs. For example, the consumer transactions may include the number of loyalty points, and their cash equivalent, used to earn discounts or receive free dining. The transaction data received from one financial service provider system may include more than one type of consumer transaction type. For example, spending transaction data received from a bank may include debit card, credit card, and eCheck consumer transactions.

In one embodiment, the offer provider system 130 may access product identification data (step 420B). In some embodiments, the accessed product identification data may include a unique identification of a product. The unique identification may be, for example, a SKU number. The product identification data may also include other data that offer provider system 130 uses to associate the transaction data with the product identification data. In certain aspects, the product identification data may include a transaction identifier, transaction time, transaction amount, or location. It may also include one or more of product specific information (e.g., product description, product price, product attributes (e.g., color, size, type, model number, serial number, or other SKU-level data), etc.

Offer provider system 130 may access the product identification data by requesting it from the merchant system 160, or merchant system 160 may transmit the product identification data to offer provider system 130 through an API. The transaction data may be sent as a data stream, text file, serialized object, or any other method known in the art for transmitting data between computing systems. In some embodiments, merchant system 160 exposes an API that it makes available to offer provider system 130. To access product identification information, offer provider system 130 may make a function call to the API to receive the data.

Those with skill in the art may contemplate additional methods for data transfer between offer provider system 130 and merchant system 160 without changing the scope and sprit of the disclosed embodiments.

In other embodiments, offer provider system 130 may access the product identification information when it accesses the transaction data (e.g., step 410B).

In some embodiments, the merchant system 160 may provide, along with or as part of the product identification data, available follow-on product data. Available follow-on product data may correspond with one or more products that the merchant would like to sell to the consumer that purchased an initial product during a physical purchase transaction. In some embodiments, the follow-on future product data may include product information related to the same product, a product that shares an attribute, or a related product of the product identified in the product identification data. For example, if a pair of gray pants are identified in the product identification data, the future product data may include product information related to another pair of gray pants that are the same style and size (same product), a pair of khaki pants that are the same style and size (product that share an attribute with the gray pants), or a belt that has the same sized waist as the gray pants (a related product).

In some embodiments, the follow-on product data may include a data set of information that can be used to complete an electronic commerce purchase transaction. For instance, the follow-on product data may include a description, image, price, or any other data associated with the follow-on product that is needed to generate an offer for the follow-on product. In some embodiments, offer provider system 130 may request additional follow-on product data as needed, if, for example, the initial follow-on product data was insufficient to generate a follow-on purchase offer for the follow-on product. For example, the merchant system 160 may only send the SKU numbers as follow-on product data. When the offer provider system 130 needs to generate a follow-on purchase offer (e.g., such as when a consumer logs in to her financial service account to view a record of the physical purchase transaction that involved a previously purchased product), the offer provider system 130 may query the merchant system 160 (e.g., through the follow-on API), to collect additional product details. For example, offer provider system 130 may use the SKU number of the follow-on product to request the product's description, price, or other attributes from the merchant system 160.

In one embodiment, if needed, offer provider system 130 may associate the transaction data with the product identification data (step 430B). Offer provider system 130 may access the transaction data and the product identification data in batches of data. In certain aspects, offer provider system 130 may be configured to determine which transactions included in the accessed transaction data correspond with the product identification data of a particular product or products. For example, offer provider system 130 may receive transaction data from financial service provider system 110 at different times than the product identification data. Offer provider system 130 may compare the product identification data to the transaction data to identify matching transactions so that the product information for a particular purchase transaction can be determined.

In certain aspects, offer provider system 130 may match transaction data to product identification data using elements of each data set. For example, offer provider system 130 can match first time data associated with the transaction data with second time data associated with the product identification data (e.g., identifying purchase transactions with the same timestamp information associated with the same financial service account for consumer 152). Alternatively, offer provider system may use other data elements to determine matches such as, for example, merchant identification data, merchant location data and the location of the transaction associated with the product, the amount of the transactions associated with the transaction data and the product identification data, etc.

In certain embodiments, offer provider system may determine a follow-on product that the merchant would like to offer to the consumer as a result of the consumer's purchase of a certain product (step 440B). As described above, in some embodiments, the offer provider system 130 may access follow-on product data from the merchant system 160 in conjunction with product identification data. Offer provider system 130 may use the follow-on product data to determine a follow-on product to include in a follow-on purchase offer.

In some embodiments, merchant system 160 may provide a product data set that includes a set of follow-on products that may be included in a follow-on purchase offer to a consumer (e.g., consumer 152). The product data set may include one or more products offered for sale by the merchant, such as a subset of products of the merchant. Offer provider system 130 may determine one or more attributes of the product purchased by the consumer (using for example the associated product identification data) and match those one or more attributes to a potential follow-on product to include in a follow-on purchase offer to the consumer. For example, a consumer may purchase gasoline from a merchant using a financial service account provided by a financial service provider associated with financial service provider system 110. Financial service provider system 110 may communicate transaction data associated with the gasoline purchase to offer provider system 130 during or just after the transaction. Merchant system 160 may communicate product identification data to offer provider 130 identifying the product the consumer purchased, i.e., gasoline. The product identification data may include a SKU number associated with 87 octane gasoline. Offer provider system 130 may be configured, in certain embodiments, to access a product data set associated with the merchant. The product data set may include pre-paid gas vouchers, coupons for beverages, coupons for car washes and gasoline additives that improve engine performance. Offer provider system 130 may use the SKU data received in the product identification data to determine a follow-on product of a pre-paid gas voucher for 87 octane gasoline. Other types of follow-on products may be identified for this example, such as products offered by the merchant, such as convenient store products, etc.

In certain aspects, offer provider system 130 may also be configured to generate a follow-on purchase offer for the follow-on product, and communicates the follow-on purchase offer to the consumer (step 450B). Offer provider system 130 may generate an offer for a follow-on product by automatically generating user interface code that may render an indication of the follow-on purchase offer on an interface that may be displayed on client device 150. For example, offer provider system 130 may generate HTML code that includes text describing the follow-on purchase offer and including a hyperlink (or similar mechanism) that, when clicked, commands a web server that may be included in offer provider system 130 to initiate purchase transaction for the follow-on product.

In certain aspects, offer provider system 130 may communicate the follow-on purchase offer to client device 150 such that that consumer 152 can view it. In some embodiments, offer provider system 130 may first communicate the follow-on purchase offer to financial service provider system 110, which may then communicate the offer to client device 150. For example, financial service provider system 110 may provide a website accessible by consumer 150 via client device 150 to manage their financial service account(s). In certain aspects, offer provider system 130 may generate HTML code (or similar information) containing the follow-on purchase offer and send the code to the financial service provider system 110. Financial service provider system 110 may use the received code to provide an HTML web page that it sends to client device 150.

In other embodiments, the follow-on purchase offer for the follow-on product may be communicated to the consumer in the consumer's electronic billing statement. According to some embodiments, consumers may be able to receive and view electronic billing statements from financial service provider system 110 or offer provider system 130, 230. The electronic billing statements may be displayed as web pages within web browsers, as user interfaces within a client side application (e.g., an application executing on a laptop, desktop, or other general purpose computing device) or in a mobile application capable of being executed on a mobile computing device (e.g., a mobile phone or PDA). An example of a user interface with an electronic billing statement and offer for future products is illustrated in FIGS. 6 and 7.

According to certain embodiments, the follow-on purchase offer for the follow-on product may be communicated in a text message sent the consumer's mobile phone. The text message may include a code that can be sent back to offer provider system 130 accepting and confirming the purchase. For example, after a consumer purchases a queen sheet set, offer provider system 130 may send a text message to the consumer asking if the consumer would like to purchase a queen sized duvet cover matching the queen sheet set. For instance, an exemplary message may include: "You just purchased The Red Queen Sheet Set, would you like to purchase the Red Queen Duvet Cover for $100? Text "12345" to 98765 to purchase."

In some embodiments, the offer to purchase the future product may be communicated in an email sent to the consumer's email account. The email may include one or more hyperlinks that, when clicked by the consumer, initiate purchase of the follow-on product.

Figure 5:
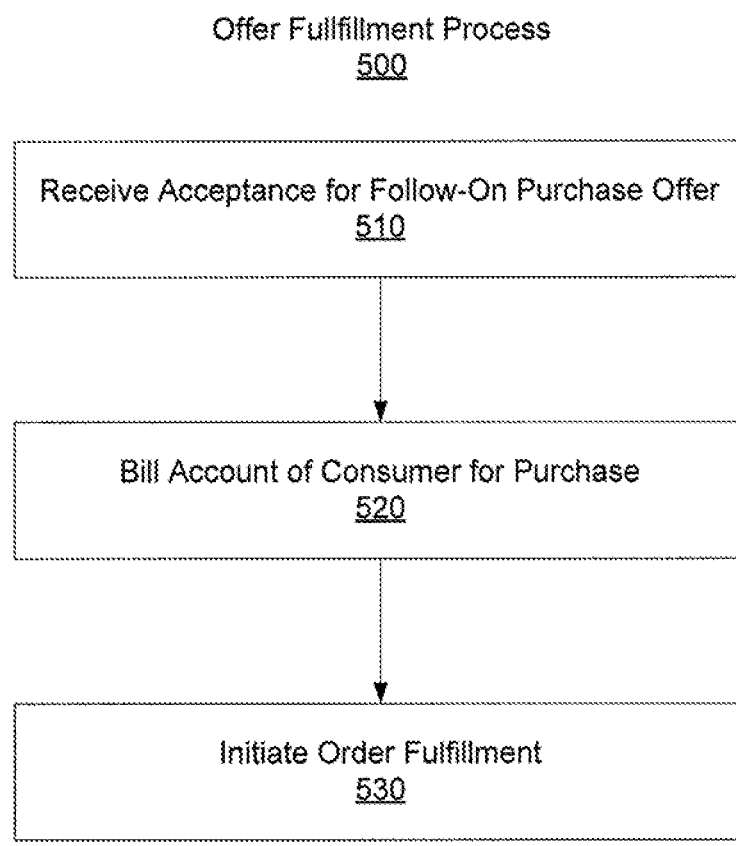
FIG. 5 is a flowchart for an offer fulfillment process consistent with disclosed embodiments.

FIG. 5 is a flowchart for an exemplary offer fulfillment process 500 consistent with disclosed embodiments. Offer fulfillment process 500 may be performed, for example, by offer provider system 130 after it communicates the follow-on purchase offer for the follow-on product to a consumer. Offer fulfillment process 500 may begin by receiving an acceptance of the offer for the follow-on product from the consumer (step 510). Offer provider system 130 may receive the acceptance through a call back inserted within a user interface. For example, the acceptance may be received via an HTML request sent in response to the consumer selecting a hyperlink or a function call made in response to the user selecting a user interface element (e.g., a user interface button). Those with skill in the art may contemplate additional methods for communicating an acceptance of an offer for a future product without changing the scope and sprit of the disclosed embodiments.

Once the offer has been received, offer provider system may bill (or cause financial service provider system 110 to bill) a financial service account of the consumer for the follow-on purchase (step 520). Offer provider system 140 may, for example, use the account information associated with the electronic billing statement in which the follow-on offer was presented to the consumer. In some embodiments, financial service provider system 110 may expose an API permitting offer provider system 140 to charge the consumer's account for the transaction. In other embodiments, merchant system 160 may expose an API that permits offer provider system 130 to make a purchase on behalf of the consumer using the consumer's account information.

After the consumer's account has been billed for the transaction, offer provider system 130 may initiate order fulfillment (step 530). Order fulfillment may include, for example, sending a request to merchant system 160 to ship the follow-on product to a designated consumer's shipping address or, when the follow-on product is an electronic item, to the consumer's email address. The order may be fulfilled using the shipping address or email address associated with the consumer's financial service account.

FIG. 6 and FIG. 7 illustrate an exemplary user interface 600 consistent with disclosed embodiments that includes an electronic billing statement 610. The exemplary electronic billing statement 610 shows recent purchases of a consumer and the details of those recent purchase, such as the date of the purchase, the description of the merchant where the purchase was made and the total amount. For some purchases, the consumer may be presented with a follow-on purchase offer for a follow-on product. As illustrated in the exemplary embodiment of FIGS. 6 and 7, the follow-on purchase offer for the follow-on product may be presented as a hyperlink 620 with the text "Click Deal Available!" To learn the details of the deal, the consumer may, for example, hover a mouse pointer 710 over the hyperlink 620 as shown in FIG. 7. The user interface may display follow-on purchase offer details in a pop-up window 720 in response to a mouse over event.

In some embodiments, the pop-up window 720 lists a description of the items purchased and their associated SKU numbers. For example, as shown in FIG. 7, the consumer purchased a blue oxford shirt, size medium (with SKU number 10005678) and a pair of gray casual pants size 34/30 (with SKU number 10004321), and the pop-window 720 lists each purchased item. Also, in some embodiments, the pop-up window 720 may provide a follow-on purchase offer to the consumer to enable the consumer to buy another product with the same SKU number (as shown in FIG. 7). Although the FIGS. 6 and 7 illustrate follow-on purchase offers for buying a follow-on product that is the same as the original purchase, in some embodiments, offer provider system 130 may determine that an associated product is also available for a follow-on purchase. As a result, pop-up window 720 may details of follow-on purchase offers for associated products instead of, or in addition to, follow-on purchase offers for products the consumer purchased in the transaction listed in the electronic statement.

While FIG. 6 and FIG. 7 illustrate one embodiment of a user interface for presenting deals to a consumer, those with skill in the art will appreciate that other embodiments may present deals differently without changing the spirit and scope of the disclosed embodiments. For example, the disclosed embodiments may present an electronic billing statement in a web browser, client application, or mobile application. Pop-up window 720 (or other type of follow-on purchase offer message) may be displayed in response to a mouse over event (as illustrated in FIG. 7) or a "tap" event in a mobile application. In other embodiments, the follow-on purchase offer details may be displayed in the electronic billing statement 610 next to the hyperlink 620.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system for providing offers for products, comprising:
one or more memory devices storing software instructions; and
one or more processors configured to execute the software instructions to:
receive transaction data corresponding to a product purchased using a financial service account, wherein the received transaction data corresponding to the product purchased using the financial service account is through an application programming interface (API);
receive product identification data identifying the purchased product;
associate the transaction data with the product identification data;
determine a follow-on product to offer for sale to a consumer that purchased the product;
provide a follow-on purchase offer for the follow-on product in an electronic message to a client device of the consumer, the follow-on purchase offer including a selectable hyperlink associated with purchase of the follow-on product in an electronic commerce purchase transaction using the financial service account;
provide follow-on purchase offer details in a pop-up window; and
initiate, automatically in response to receipt of an acceptance request, an electronic commerce purchase transaction with the merchant for the follow-on product using the financial service account.

2. The system of claim 1, further comprising transmitting a confirmation of the electronic commerce purchase transaction to a mobile device.

3. The system of claim 1, wherein the product identification data also identifies the follow-on product.

4. The system of claim 1, wherein the follow-on product shares at least one attribute with the product.

5. The system of claim 1, wherein determining the follow-on product to offer for sale is based on the product identification data and the follow-on product is selected from a set of products offered by the merchant.

6. The system of claim 1, wherein the follow-on product is a voucher capable of being redeemed at a merchant from which the product was purchased or for a good or service offered by a manufacturer of the product.

7. The system of claim 1, wherein the follow-on purchase offer details is provided in a pop-up window in response to a mouse over event associated with the selectable hyperlink.

8. The system of claim 1, wherein the follow-on purchase offer is communicated via an electronic billing statement capable of being displayed within at least one of a web browser, a client side application at the client device, or a mobile application.

9. The system of claim 1, wherein the one or more processors are further configured to execute the software instructions to receive an acceptance of the follow-on purchase offer.

10. The system of claim 9, wherein the one or more processors are further configured to execute the software instructions to bill the financial service account associated with the transaction data.

11. The system of claim 10, wherein the one or more processors are further configured to execute the software instructions to initiate order fulfillment of the follow-on product.

12. A computer-implemented method for providing offers for products, comprising:
  receiving, by one or more processors configured to execute software instructions to perform operations to link purchase transactions to electronic commerce follow-on purchase transactions, transaction data corresponding to a product purchased using a financial service account, wherein the received transaction data corresponding to the product purchased using the financial service account is through an application programming interface (API);
  receiving, by the one or more processors, product identification data identifying the purchased product;
  associating, by the one or more processors, the transaction data with the product identification data;
  determining, by the one or more processors, a follow-on product to offer for sale to a consumer that purchased the product;
  generating, by the one or more processors, a follow-on purchase offer for the follow-on product, the follow-on purchase offer including a selectable hyperlink associated with purchase of the follow-on product using the financial service account;
  providing, by the one or more processors, the follow-on purchase offer in an electronic message to a client device of the consumer, wherein the selectable hyperlink of the follow-on purchase offer is selectable using the client device to enable automatic purchase of the follow-on product in an electronic commerce purchase transaction using the financial service account;
  providing follow-on purchase offer details in a pop-up window; and
  initiating, automatically in response to receipt of an acceptance request, an electronic commerce purchase transaction with the merchant for the follow-on product using the financial service account.

13. The method of claim 12, further comprising transmitting a confirmation of the electronic commerce purchase transaction to a mobile device.

14. The method of claim 12, wherein the product identification data also identifies the follow-on product.

15. The method of claim 12, wherein the follow-on product shares at least one attribute with the product.

16. The method of claim 12, wherein determining the follow-on product to offer for sale is based on the product identification data and the follow-on product is selected from a set of products offered by the merchant.

17. The method of claim 12, wherein the follow-on product is a voucher capable of being redeemed at a merchant from which the product was purchased or for a good or service offered by a manufacturer of the product.

18. The method of claim 12, wherein providing the follow-on purchase offer includes communicating the follow-on purchase offer via an electronic billing statement capable of being displayed within at least one of a web browser, a client side application at the client device, or a mobile application.

19. The method of claim 12, further including receiving, by the one or more processors, an acceptance of the follow-on purchase offer.

20. A system for automatically linking one or more purchase transactions with one or more electronic commerce purchase transactions, comprising:
  one or more memories storing software instructions; and
  one or more processors configured to execute the software instructions to perform one or more operations for linking one or more purchase transactions with one or more electronic commerce purchase transactions, the operations including:
    receiving transaction data relating to a purchase transaction associated with a financial service account, wherein the transaction data includes product identification data that includes product attribute information describing one or more attributes about a product, and wherein the received transaction data corresponding to the product purchased using the financial service account is through an application programming interface (API); and
    linking, based on the transaction data, the purchase transaction with a follow-on electronic transaction associated with a follow-on product, wherein the linking includes:
    generating a follow-on purchase offer for the follow-on product at a follow-on product price;
    including in the follow-on purchase offer, a selectable hyperlink associated with purchase of the follow-on product using the financial service account;
    providing the follow-on purchase offer to the user in an electronic message to a client device of the user, the selectable hyperlink of the offer being selectable within the electronic message by the user using the client device;
    provide follow-on purchase offer details in a pop-up window;
    performing an electronic commerce purchase transaction for the follow-on product by applying the follow-on product price to the financial service account; and
    initiating fulfillment processes with the merchant, that enable the follow-on product to be shipped to an address associated with the financial service account.

* * * * *